No. 663,256. Patented Dec. 4, 1900.
W. B. BROWN.
FILTER.
(Application filed Mar. 28, 1900.)
(No Model.) 3 Sheets—Sheet 1.
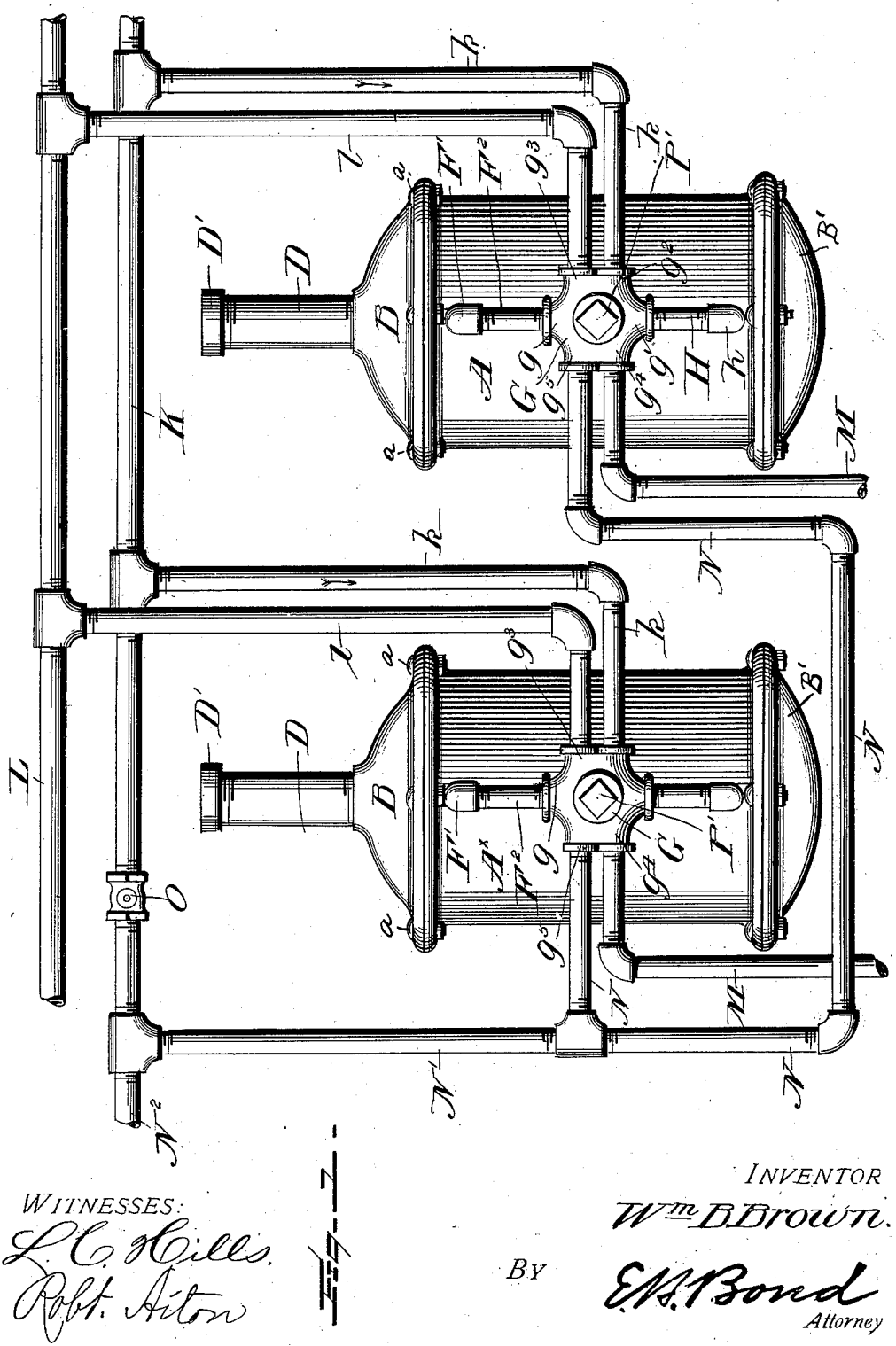
WITNESSES:
L. C. Hills
Robt. Aiton
INVENTOR
Wm B Brown.
By
E. H. Bond
Attorney

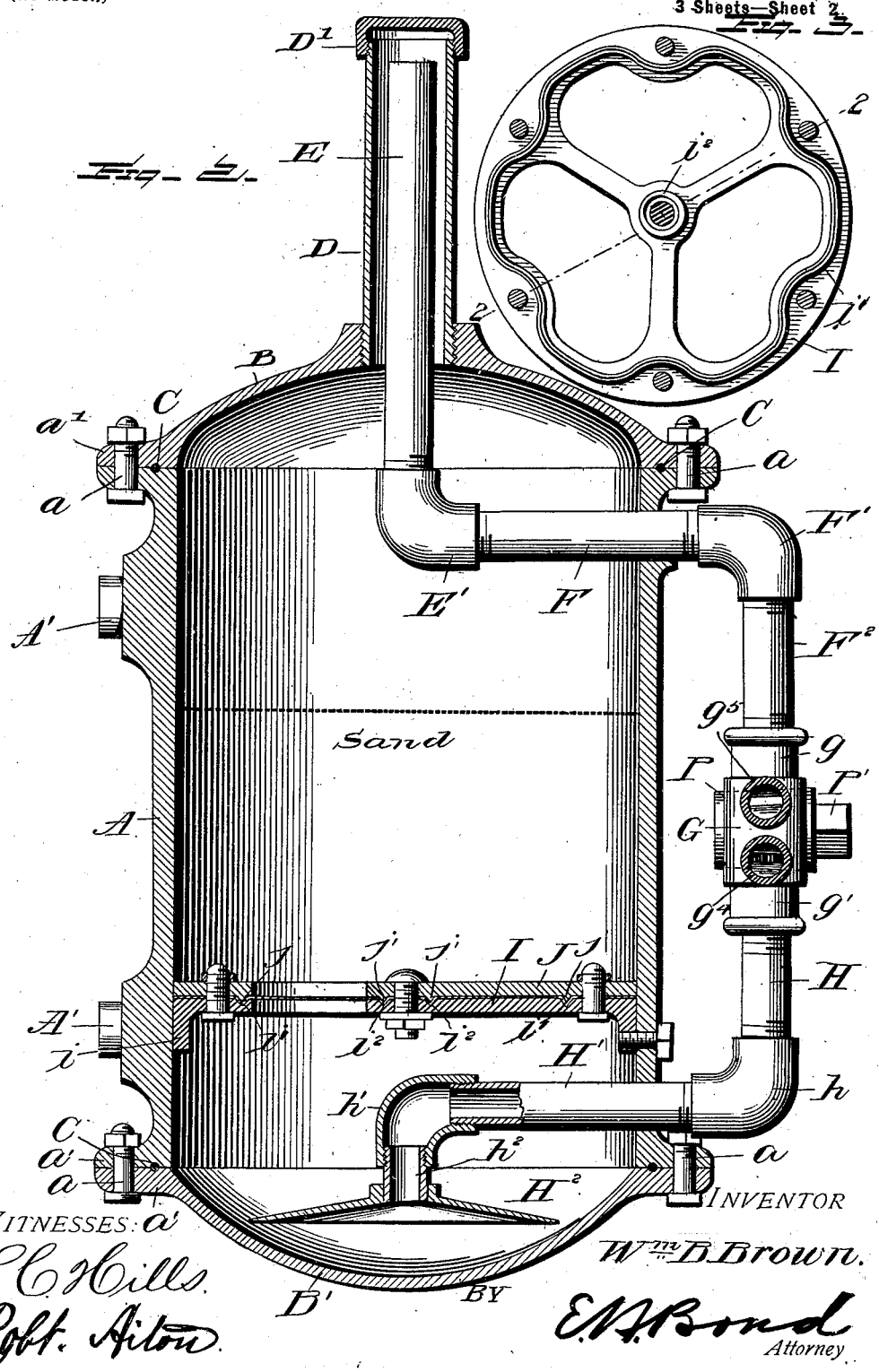

No. 663,256. Patented Dec. 4, 1900.
W. B. BROWN.
FILTER.
(Application filed Mar. 28, 1900.)
(No Model.) 3 Sheets—Sheet 3.
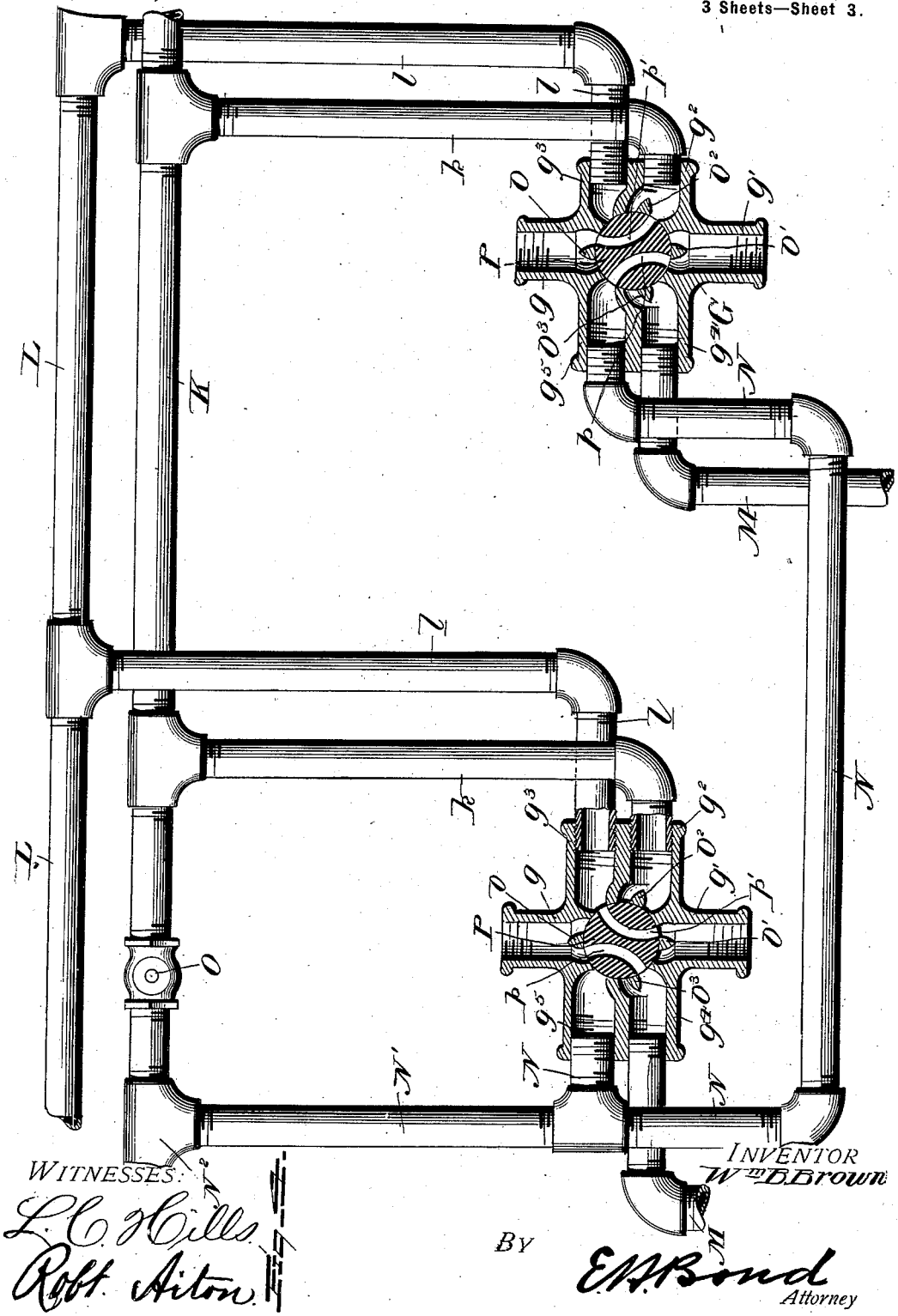
WITNESSES:
L. C. Hills
Robt. Aiton
INVENTOR
Wm B. Brown
BY
E. H. Bond
Attorney

UNITED STATES PATENT OFFICE.

WILLIAM B. BROWN, OF BALTIMORE, MARYLAND.

FILTER.

SPECIFICATION forming part of Letters Patent No. 663,256, dated December 4, 1900.

Application filed March 28, 1900. Serial No. 10,499. (No model.)

*To all whom it may concern:*

Be it known that I, WILLIAM B. BROWN, a citizen of the United States, residing at Baltimore, in the State of Maryland, have invented certain new and useful Improvements in Filters; and I do hereby declare the following to be a full, clear, and exact description of the invention, such as will enable others skilled in the art to which it appertains to make and use the same.

This invention relates to certain new and useful improvements in filters of that class connected up in pairs and having provision for the cleansing, when desired, by the reversal of the flow of the liquid.

The present invention has for its objects, among others, to improve upon this style of filters, to the end that better results may be attained, effecting a saving in the cost of manufacture and avoiding the necessity of the employment of gaskets, which have been found to be objectionable. I provide a novel form of valve and casing therefor, whereby I am enabled to pass the first filtrate to waste, to clean out with either hot or cold water, to shut off the flow to the one filter for the purpose of repairs or otherwise, and to filter from either or both, as occasion may require. I dispense with a top screen and prevent the sand from passing out with the water either in filtering or in cleaning out. I aim, further, at improvements in the details of construction, as will be more fully hereinafter described, shown in the drawings, and then particularly pointed out in the appended claims.

The invention in its preferred form is clearly illustrated in the accompanying drawings, which, with the letters of reference marked thereon, form a part of this specification, and in which—

Figure 1 is an elevation showing a pair of filters constructed and connected up in accordance with my invention. Fig. 2 is a substantially central vertical section through one of the filters with parts in elevation and portions broken away. Fig. 3 is a plan of one of the screen-holding plates with the securing-bolts in section. Fig. 4 is a detail, enlarged, in elevation with portions in section, showing the valves and their coöperating ports in their casings and the connections with said casings.

Like letters of reference indicate like parts throughout the several views.

Referring now to the details of the drawings by letter, A designates the body portion of the filter, which may be of any suitable material, shape, and capacity, to which the heads B and B' are secured in any well-known way—in this instance shown as held by the bolts $a$, which pass through the flanges $a'$ on the ends of the body and the heads, a suitable packing-ring C being employed, as seen clearly in Fig. 2. The upper head B is provided centrally with an opening, which is interiorly screw-threaded, as seen best in Fig. 2, and into this opening is threaded the tube D, which is provided with a removable cap D', as shown best in said Fig. 2. This tube may be of any required length, and up into the same extends the pipe E, nearly to the top thereof, as seen in Fig. 2. This pipe is connected at its lower end with an elbow E', which in turn receives the horizontal pipe F, which passes through an opening in the side wall of the body portion of the filter, where it enters the elbow F', into which is secured the vertical pipe $F^2$, which connects with the nipple $g$ of the valve-casing G. This valve-casing and its ports and passages will be described later on. Importance is attached to the tube D and the pipe E, extending thereinto, and to the fact that they be disposed above the filter-bed, so that the water will be aerated in its fall from the upper end of the pipe, and in the cleansing of the filter by the reversal of the flow all the light particles will float to the upper part of the filter and be carried away through the said pipe. Furthermore, by extending the tube D and pipe E above the upper head of the filter I am enabled to prevent the sand from flowing out of the filter when cleaning it and dispense with the top screen usually employed. The height of the tube is regulated according to the pressure and volume of water. In cleaning out the filter the current or flow of water is reversed and the dirt and sand rise together; but the sand being the heavier will not rise as high as the tube. The dirt, however, being lighter, passes off to the waste-pipe.

H is a pipe joined to the nipple $g'$ of the valve-casing, as shown in the various views, and this pipe is connected with the elbow $h$, which in turn receives the outer end of the horizontal pipe H', which passes through the wall of the body portion of the filter near its lower end, as seen clearly in Fig. 2, and upon its inner end it receives the elbow $h'$, into which is adjustably secured the short vertical pipe $h^2$, which carries the spreader-plate $H^2$, the upper surface of which is inclined, as shown, so as to spread the water outward toward the sides of the body as it falls thereupon, in a manner which will be readily understood. This spreader-plate may be adjusted vertically to suit the varying circumstances under which it may be found desirable to use it. The lower head is concaved upon its inner surface, as shown, and this spreader-plate extends well down into the same, so that the water falling thereupon is forced to pass therefrom against the walls of this lower head.

The outer wall of the body portion may be provided with suitable means, as the lugs A', by which the filter may be supported in the desired position.

I is a spider or ring or plate having a vertical flange $i$ for the reception of the bolts or other means by which it is secured to the inner wall of the filter-body, as seen in Fig. 2. This spider or ring or plate is shown in detail in Fig. 3, and it is through the dotted line 2 2 of this figure that the section of Fig. 2 is taken. As seen in said Fig. 3, this element of the device is formed with a sinuous depression or channel $i'$ around its outer edge and also with a V-shaped channel or depression $i^2$ around the central boss or opening, through which passes the central securing-bolt, as seen best in Fig. 2.

J is the male or coöperating ring, spider, or plate, substantially the same in design as the plate I, but having around its edge a tortuous or sinuous substantially V-shaped rib or projection $j$ and around the central bolt-hole a substantially V-shaped rib $j'$, as shown clearly in Fig. 2, and adapted to fit the V-shaped channels of the plate $i$. Interposed between these two plates or rings is the screen K, and when the two plates are drawn together by their securing-bolts or other means the screen is drawn into the V-shaped channels of the female plate by the ribs of the male plate and there securely held, and the necessity for gaskets at this point is entirely obviated.

So much for the interior construction of the filters. It now remains to describe the manner of connecting up the filters and their valves. In practice two or more of these filters may be connected in series. In this instance I have chosen to show but two; but it will be understood that I do not intend to restrict myself to this or any other definite number. As seen in Fig. 1, the two filters A and A$^\times$ are supposed to be supported in any suitable manner (not shown) and are connected up in the following manner: K is the service-pipe for cold water, from which is a connection $k$ to each of the filters, the horizontal pipe of such connection being secured to the nipple $g^2$ of the valve-casing, as shown. L is the hot-water service-pipe leading from any suitable source, and from this pipe are the connections $l$ with the nipples $g^3$ of the valve-casings G. Connected with the nipples $g^4$ of the valve-casings are the pipes M, which lead to the sewer or to waste. Connected with the nipples $g^5$ of the said valve-casings are the pipes N, which are for the purpose of conveying the filtered water to the service, and, as seen in Figs. 1 and 2, these pipes join the common pipe N', which connects with the delivery-pipe N$^2$ at a point beyond the by-pass O, which is at all times closed, so as to force the water from the service to pass to the filters, as indicated by the arrows in Fig. 1.

Referring now to Fig. 4, the construction of the valve-casings and their valves will be readily understood. As seen in said figure, each valve-casing G has the six nipples, as above described, and these are disposed as seen in said Fig. 4. The passage through the nipple $g$ is divided by a diaphragm $o$, so that the fluid may be caused to take either of two different courses, and the passage in the nipple $g'$ is likewise divided by a diaphragm $o'$, the passage through the nipple $g^2$ by a like diaphragm $o^2$, and that through the nipple $g^4$ by a diaphragm $o^3$, all as clearly seen in said Fig. 4. The valve P is formed with the two curved ports or passage-ways $p$ and $p'$, which are disposed as shown for a purpose which will soon be made apparent. The valve is designed to be turned in any suitable manner, in this instance being shown as provided with a polygonal portion P' to receive a wrench or other suitable tool or implement.

It is evident that the arrangement of the pipes, &c., may be different under different circumstances. For instance, in Fig. 4 the relative arrangement of the pipes K, L, $k$, and $l$ is somewhat different from that shown in Fig. 1; but the action and result is the same. So it may be with other parts, and I desire to cover any and all of such different dispositions of the parts as the exigencies of the case may require.

With the parts constructed and arranged substantially as above specified the operation is as follows: It being understood that the valve or by-pass O is closed, so the water flowing through the pipe K must pass into the filters, and that the hot water is shut off, and the valve P at the right of Fig. 4 being in the position there shown, the water flows through the pipe $k$, through the passage-way $p'$ of the valve, through the nipple $g$ and pipe F$^2$, elbow F', pipe F, and elbow E' into the upright pipe E, which, as above described, extends up within the tube D, as seen in Fig. 2, and overflowing at the upper end of the pipe E it falls down the tube D into the filter upon the sand therein and through the screen onto the spreader-plate, by which it is spread and forced against the walls of the lower head, and from thence it passes up the pipe $h^2$, elbow $h'$, along the pipe H', elbow $h$, and pipe H into the nipple $g'$, and through the passage-way $p$ of the valve into the nipple $g^5$, and thence down the pipe N into the pipe N' to service. The valve of the other filter being in the same relative position the water entering the same from the pipe $k$ will take the same course. With the valve, however, in the position in which it is shown in Fig. 4, at the left, the cold water is shut off from the filter and the hot water is being admitted. It enters through the pipe $l$ into the nipple $g^3$, through the passage $p'$ of the valve, and through the pipe H and pipe H' into the bottom of the filter, up through the granular bed therein, up into the tube D, down the pipe E, and through the pipe F, elbow F", and pipe $F^2$ into the nipple $g$, and through the passage-way $p$ of the valve into the pipe M to waste. This cleanses out the filter, after which the valve should be turned from the position which it occupies in Fig. 4 at the left into that shown at the right of the same figure, and the cold water will then flow as before. The arrangement and disposition of the passage-ways of the valves and the ports and seats of the valve-casing are such that the simple turning of the valve will serve to cause the water to flow in the direction desired, so that I may shut off the water from the filter, flush or clean out with either hot or cold water, pass the filtrate to waste, filter to the service, or make it take any other course which circumstances may require. Either of the filters may be shut off without interfering with the successful operation of the other.

From the foregoing it will be seen that I have devised a novel and efficient filter; but while the structural embodiment herein illustrated and described is believed at this time to be preferable I do not desire to limit myself thereto, but reserve the right to effect such changes, modifications, and variations as may come properly within the scope of the protection prayed.

What I claim as new is—

1. A filter-body, a filter-bed support therein, a tube extending upward from the upper head, an inlet for the fluid extending up into said tube, and an outlet from the bottom of the body beneath the filtering-bed, as set forth.

2. A filter-body, a tube extending upward from the upper head thereof, an inlet-pipe extending up within said tube, a filter-bed support within said body, an outlet beneath the said support, a valve-casing and a valve and ports whereby the fluid may be caused to enter at either the top or bottom, as set forth.

3. The combination with a filter-body, of a filter-bed support within the same and consisting of two rings with a screen therebetween, the said rings having the one a substantially V-shaped sinuous channel and the other a similarly-shaped sinuous rib to engage therein whereby the employment of gaskets is obviated, as set forth.

4. In a filter, the combination with the body, of a ring having an annular flange by which it is secured within the body, and provided with a sinuous substantially V-shaped channel, and an independent plate or ring having a sinuous substantially V-shaped rib to engage in said channel, as set forth.

5. In a filter, a ring having a sinuous substantially V-shaped channel in combination with a ring having a substantially similar rib, as set forth.

6. In a filter, a filter-bed support composed of two rings having interengaging sinuous substantially V-shaped channel and rib, and means for clamping between them a screen, as set forth.

7. Two filters having common connection with a source of supply of both hot and cold water, and with a delivery-pipe for filtered water, and valves each having a curved port upon each side of the center and casings therefor with ports and passages whereby the water may be caused to flow in the manner specified.

8. In a filter, the combination with a valve-casing having upper and lower ports and two independent ports upon opposite sides, of a valve rotatably mounted in said casing and having two curved ports, one upon each side of the center, as shown and described.

9. In a filter, the combination with a rotatable valve having two curved ports one upon each side of its center, of a valve-casing having nipples at top and bottom and two upon each side, the top and bottom nipples and one of those upon each side being divided, substantially as and for the purpose specified.

10. The combination with a rotatable valve having a curved port upon each side of its center, of a valve-casing having ten independent ports as and for the purpose specified.

In testimony whereof I affix my signature in presence of two witnesses.

WILLIAM B. BROWN.

Witnesses:
LUCIEN B. CARPENTER,
WM. H. MASSON.